May 28, 1940.   T. B. HARWELL   2,202,774
MOWER
Filed Feb. 2, 1939   2 Sheets-Sheet 1
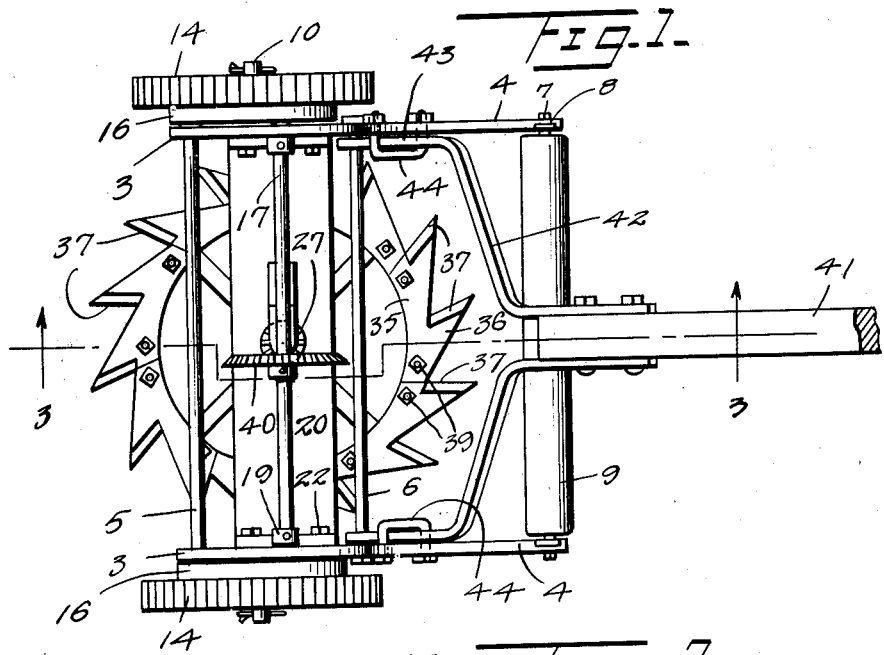
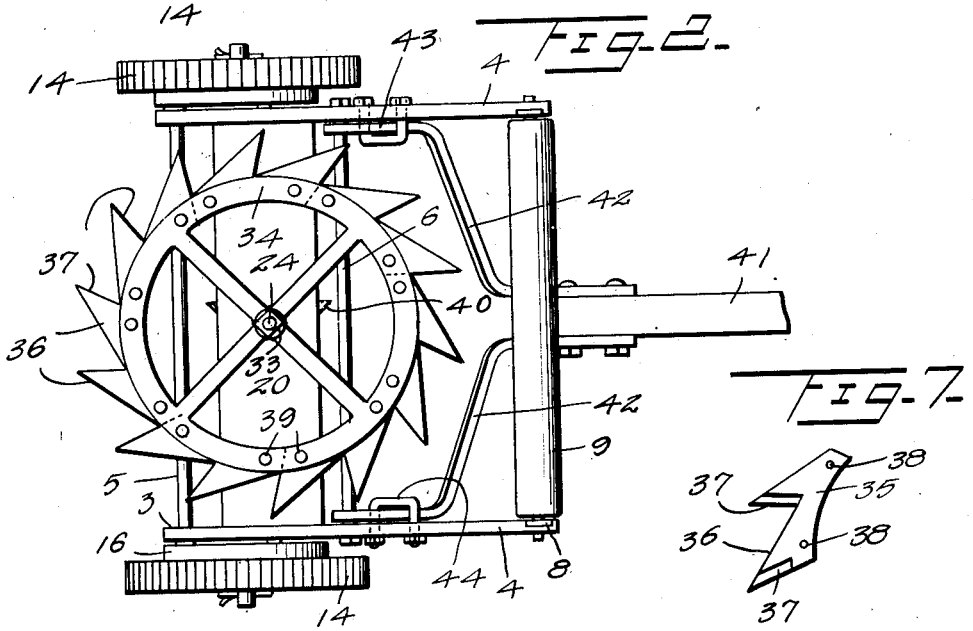
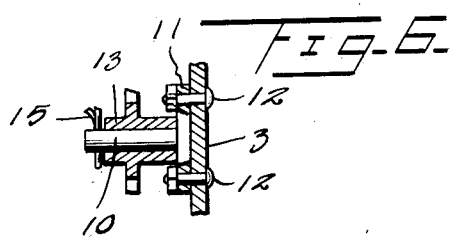
Inventor
T. B. Harwell
By Watson E. Coleman
Attorney

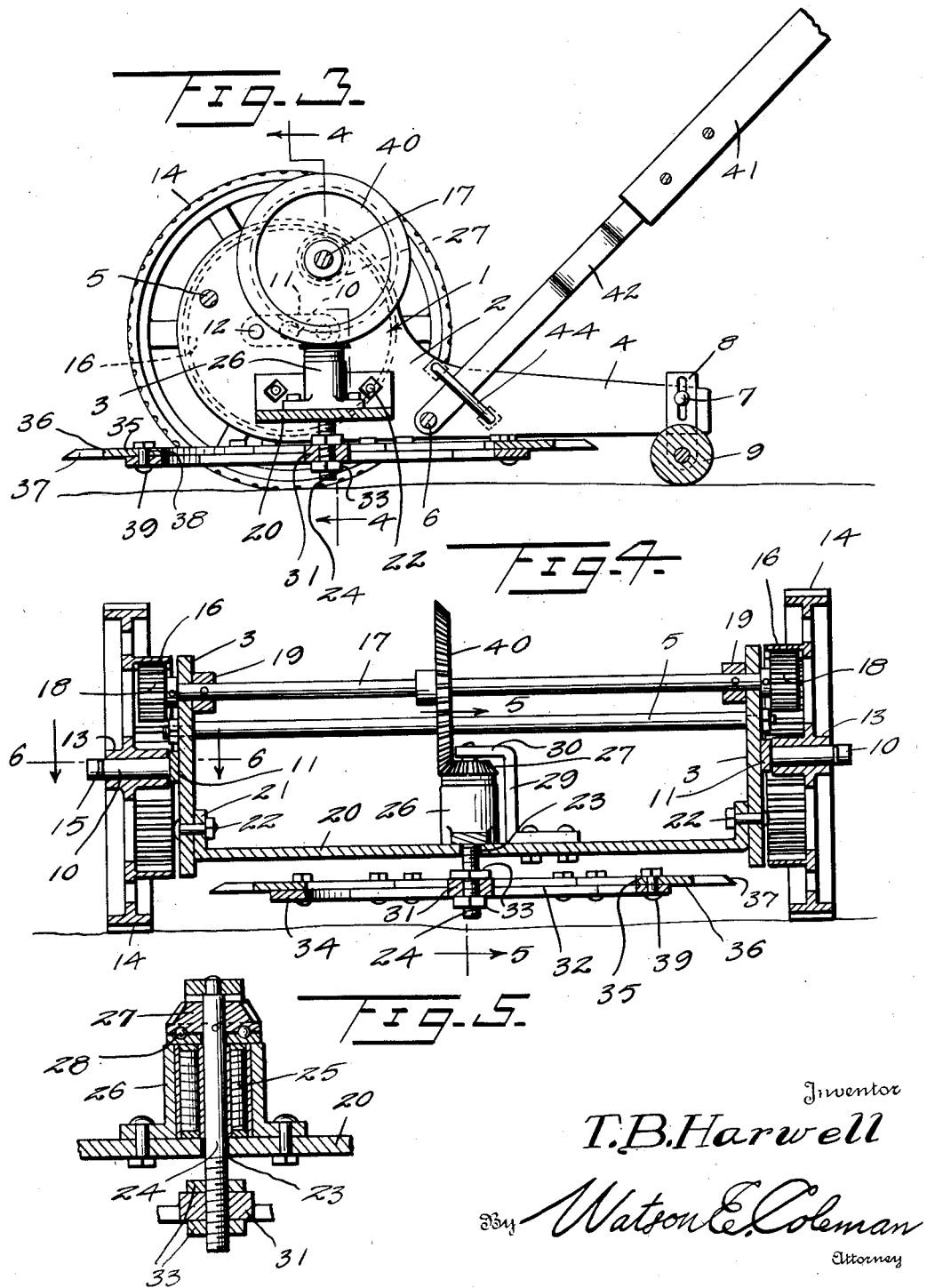

Patented May 28, 1940

2,202,774

UNITED STATES PATENT OFFICE 2,202,774

MOWER

Thomas B. Harwell, Henryetta, Okla.

Application February 2, 1939, Serial No. 254,289

3 Claims. (Cl. 56—255)

This invention relates to the class of mowing machines and pertains particularly to grass and weed cutters.

The present invention has for its primary object to provide a novel type of cutting or mowing machine which will operate efficiently for the cutting of tall grass and weeds which mowers of the usual design, employing a rotating blade reel, will not cut due to the fact that the reel is not of sufficient size or diameter to move the blades thereof over the tops of tall stalks of grass and weeds.

Another object of the invention is to provide a novel mowing machine which employs a circular or annular cutter provided with a series of substantially radially extending cutting edges, the cutter annulus being supported for rotation in a horizontal plane so that the edges of the cutting blades will move across the grass and weed stalks to sever the same relatively closely to the ground.

A further object of the invention is to provide a mowing machine of the above described character which is of simple construction and which has relatively few moving parts which require attention.

A still further object is to provide a mowing machine having an annular cutter or sickle supported for rotation in a horizontal plane and adapted to be adjusted vertically so that the cutting plane may be raised or lowered as may be desired.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in top plan of the mower embodying the present invention.

Fig. 2 is a view in bottom plan of the same.

Fig. 3 is a sectional view taken on the line 3—3 of Fig. 1.

Fig. 4 is a sectional view taken on the line 4—4 of Fig. 3.

Fig. 5 is a sectional view taken on the line 5—5 of Fig. 4.

Fig. 6 is a sectional view taken on the line 6—6 of Fig. 4.

Fig. 7 is a view in plan of one cutter unit of the cutting reel which comprises two cutting blades.

Referring now more particularly to the drawings, the present mower has a frame indicated as a whole by the numeral 1, which is made up of two relatively long side boards or plates 2, each of which has a forward substantially circular end portion 3 and a rearwardly extending tail portion 4, the lower edge of the tail portion extending tangentially from the forward portion 3, as shown in Fig. 3. These side plates are horizontally disposed in spaced parallel relation, as shown, and they are coupled together by the tie bars 5 and 6, which extend transversely of the machine. At the rear ends of the tail pieces 4, means is provided in the form of a screw or bolt 7 for securing the vertically adjustable brackets 8 between which is supported the ground engaging rear wheel or roller 9, this roller extending across the machine between the rear ends of the side plates, as illustrated in Figs. 1 and 2.

Secured to the outer side of the circular portion 3 of each side plate and at the center thereof, is a stub axle 10, one end of which is formed to provide the two ears 11 which are bolted to the adjacent plate by the bolts 12 as shown in Fig. 6. Each of these stub axles has rotatably supported thereon the hub 13 of a ground engaging wheel 14 and the outer end of the axle may have a cotter key 15 or any other suitable device attached thereto to retain the wheel thereon.

Upon the inner side of each wheel 14 is an internal gear 16 and there extends between the plates 2, the rotatable shaft 17, the ends of which pass through the portions 3 of the plates and carry, upon the outer sides of the plates, the gear pinions 18 which are disposed within and are in toothed engagement with the adjacent internal gears. Suitable means such as the collar 19, is secured to the shaft 17 at the inner side of each plate to hold the shaft against longitudinal shifting.

The shaft 17 is disposed adjacent the top of the frame and directly beneath the shaft there is secured between the parts 3 of the plates, the horizontal reel plate 20. This plate may be secured in any suitable manner at its ends to the side plates of the frame, the means here shown for attaching it comprising the upturned transverse flanges 21 which are bolted by the bolts 22 to the side plates.

At the point of intersection of the longitudinal and transverse centers of the reel plate 20, an opening 23 is formed for the extension through the plate of the reel shaft 24. The upper end of this shaft passes through a suitable bearing unit 25 of the type commonly known as a roller bearing, which bearing unit is enclosed within the upstanding housing 26 and secured to the upper end of the shaft 24 above the housing 26 is a bevel gear pinion 27 which has interposed between it and the housing 26, a suitable bearing 28 which serves in the nature of a thrust bearing as it supports the weight of the shaft 24, the adjacent gear pinion and the reel which is about to be described.

Secured to the plate 20 at one side of the housing 26 is a bracket 29, the upper end of which has a horizontally extending portion 30 in which the upper end of the shaft 24 is rotatably engaged.

The lower end of the shaft 24 is screw threaded, as shown, and these threads are engaged with corresponding threads formed in the hub portion 31 of the reel wheel 32. Secured above the hub 31 to the shaft 24 are adjusting nuts 33 by which the wheel is held in adjusted position upon the shaft 24, this adjustment being accomplished by loosening the nuts and turning the wheel on the shaft so that by means of the screw thread connection between its hub and the shaft, the wheel may be raised or lowered. After the desired adjustment is obtained, the nuts are threaded back into engagement with the adjacent sides of the hub so as to prevent further movement of the wheel on the shaft.

The rim 34 of the wheel is provided with suitable bolt apertures and there are disposed on the rim a series of cutter units in the form of arcuate plates 35, each of which has integrally formed therewith two pointed and tangentially extending cutter blades 36, the cutting edges of which are indicated at 37. Each plate has bolt apertures 38 formed therethrough to correspond with the apertures in the rim of the wheel 32 and bolts 39 are passed through the plates and the wheel rim to secure the cutter plates or cutter units thereto so that they will be arranged in a circular or annular group with the cutting edges all directed in the same direction. By the arrangement of the cutters 36 tangentially to the plates 35 and consequently to the rim of the wheel 32 and by forming the short edges of these pointed or triangular plates for the cutting operation, the cutting edges are arranged to extend at an angle which is between a tangent to the rim of the wheel 32 and the radius of the wheel. Thus the cutting edges will be inclined slightly in the direction of rotation of the reel.

Power is transmitted from the power shaft 17 to the reel shaft 24 by means of the large bevel gear 40 which is mounted upon the shaft 17 and meshes with the bevel gear pinion 27, as shown.

While the present mower may be made in any size desired and power operated or manually operated, as may be desired, it is here shown as having means for its manual propulsion, which means comprises a handle shaft 41 which at its forward end is secured between bracket arms 42, each of which has a forward terminal portion 43 which is parallel with the handle and which is disposed against the inner side of a plate 2 and pivotally supported upon the rear tie rod 6. The vertical swinging movement of the handle is controlled by means of a U-bolt 44 which straddles each extension 43 of the handle bracket and has its ends or legs secured in the adjacent plate 2 as is clearly illustrated in Figs. 1 and 2.

From the foregoing, it will be readily apparent that a machine constructed in accordance with the present invention will operate efficiently for the cutting of tall grass or weeds where a mower of the ordinary reel type would not be satisfactory. By properly proportioning the gearing connection between the shafts 17 and 24, any desired rotary speed might be transmitted to the horizontally rotatable cutting wheel 32 which carries the cutting blades so that by gearing the cutting wheel to high rotary speed a highly efficient cutting action may be obtained. It will also be apparent that the construction of the present machine is relatively simple so that it will not only require a minimum of attention or servicing but it may be relatively inexpensively manufactured.

What is claimed is:

1. A mower, comprising a frame including two spaced vertical side plates, a horizontal plate secured between said side plates at the lower edges thereof, tie rods coupling the side plates, a wheel pivotally supported upon the outer side of each plate, a vertical shaft extending through and rotatably supported by said horizontal plate, an annular cutting reel secured to the vertical shaft beneath the horizontal plate for rotation in a horizontal plane, means for transmitting rotary power from said wheels to said vertical shaft, means whereby the movement of the mower over the ground may be facilitated, said cutter reel comprising a wheel having a rim portion, and a series of cutter units removably secured to the rim portion and each consisting of an arcuate plate in end abutting relation to other plates and having formed integrally therewith a pair of substantially triangular tangentially directed blades each having a cutting edge.

2. A mower, comprising a frame including two spaced vertical side plates, a horizontal plate secured between said side plates at the lower edges thereof, tie rods coupling the side plates, a wheel pivotally supported upon the outer side of each plate, a vertical shaft extending through and rotatably supported by said horizontal plate, an annular cutting reel secured to the vertical shaft beneath the horizontal plate for rotation in a horizontal plane, means for transmitting rotary power from said wheels to said vertical shaft, means whereby the movement of the mower over the ground may be facilitated, said cutter reel comprising a wheel having a rim portion, and a series of cutter blades removably secured to the rim and projecting tangentially therefrom with the cutting edges directed in the direction of rotation of the wheel, said wheel being connected with the vertical shaft for adjustment vertically thereon between the horizontal plates and the ground.

3. A mower, comprising a frame including two spaced vertical side plates, tie bars connecting said side plates at the lower edges thereof, a horizontal plate between and joined to said side plates and supported thereby in close proximity to the ground, a stub shaft secured to the outer side of each side plate, a wheel mounted upon each stub shaft, said wheel including an internal ring gear, a power shaft extending between said side plates and having its ends passing therethrough, a pinion upon each end of said shaft engaging with the adjacent ring gear, a vertical shaft extending through said horizontal plate, a vertical bearing sleeve supported upon said plate and having said vertical shaft extending therethrough and supported thereby, bearings in said sleeve and surrounding the vertical shaft, a driving connection between the power shaft and the vertical shaft, a cutting reel beneath the horizontal plate and having the vertical shaft extending axially therethrough, said cutting reel including peripherally arranged outwardly projecting cutter blades, means for propelling the machine, screw threads coupling said reel with said shaft whereby the reel may be vertically adjusted thereon, and means for securing the reel against movement on the vertical shaft after adjustment.

THOS. B. HARWELL.